United States Patent
Ono et al.

(10) Patent No.: US 9,388,895 B2
(45) Date of Patent: Jul. 12, 2016

(54) LUBRICATION STRUCTURE FOR TRANSMISSION

(71) Applicant: HONDA MOTOR CO., LTD, Tokyo (JP)

(72) Inventors: Yuki Ono, Wako (JP); Shinji Nagahama, Wako (JP)

(73) Assignee: HONDA MOTOR CO., LTD, Tokyo (JP)

( * ) Notice: Subject to any disclaimer, the term of this patent is extended or adjusted under 35 U.S.C. 154(b) by 0 days.

(21) Appl. No.: 14/515,856

(22) Filed: Oct. 16, 2014

(65) Prior Publication Data
US 2015/0128738 A1    May 14, 2015

(30) Foreign Application Priority Data
Nov. 8, 2013  (JP) ................. 2013-232562

(51) Int. Cl.
*F16H 3/08*  (2006.01)
*F16H 57/04*  (2010.01)
*F16H 3/12*  (2006.01)
*F16H 57/027*  (2012.01)

(52) U.S. Cl.
CPC ............ *F16H 57/0423* (2013.01); *F16H 3/12* (2013.01); *F16H 57/027* (2013.01); *F16H 57/0494* (2013.01); *F16H 57/0457* (2013.01); *Y10T 74/19284* (2015.01)

(58) Field of Classification Search
CPC . F16H 3/006; F16H 2003/0931; F16H 3/091; F16H 47/02; F16H 57/0412; F16H 57/0421
USPC ................. 74/325, 330, 331, 606 A
See application file for complete search history.

(56) References Cited

U.S. PATENT DOCUMENTS

| | | | | |
|---|---|---|---|---|
| 4,903,798 A * | 2/1990 | Takemoto | ............... | F16N 39/06 184/6.12 |
| 5,107,718 A * | 4/1992 | Inagawa | ............... | B60K 17/046 184/104.1 |
| 5,261,289 A * | 11/1993 | Birch | ............... | F16H 1/20 74/413 |
| 7,165,651 B2 * | 1/2007 | Hiraga | ............... | F01M 1/12 123/196 R |
| 7,779,727 B2 * | 8/2010 | Mukouhara | ............... | F02N 15/006 184/6.12 |
| 8,495,928 B2 * | 7/2013 | Yamaguchi | ............... | F16H 57/027 74/606 R |

FOREIGN PATENT DOCUMENTS

JP    2007-159314 A    6/2007

* cited by examiner

*Primary Examiner* — Ha D Ho
(74) *Attorney, Agent, or Firm* — Westerman, Hattori, Daniels & Adrian, LLP (57) ABSTRACT

Provided with a hollow piping member attached in a casing and a guide member integrally installed on an outer peripheral surface of the piping member. The guide member is structured by a plurality of surfaces including a first surface on which at least part of hydraulic fluid pumped up by a final gear is received and a second surface connected to one end of the first surface extending along a side of the final gear, and fastened to the casing by a fastener. The guide member receives hydraulic fluid pumped up by the final gear, restraining the fluid from reaching a breather mechanism and neighborhoods thereof.

16 Claims, 7 Drawing Sheets

LUBRICATION STRUCTURE FOR TRANSMISSION

CROSS-REFERENCE TO RELATED APPLICATION

The present disclosure relates to a subject included in Japanese Patent Application 2013-232562 filed dated on Nov. 8, 2013, and, as a whole, the disclosure therein should be incorporated in this application explicitly by reference.

BACKGROUND

This invention relates to a lubrication structure for lubrication in a casing of a transmission which stores a plurality of shafts and gears by hydraulic fluid pumped up by a rotation of a final gear for a final speed reduction gear.

As a lubrication structure provided by a transmission such as an automatic transmission installed on a vehicle, there is a lubrication structure disclosed in Japanese Laid Open Patent Application No. 2007-159314 (Patent Document 1). This lubrication structure is configured so that in a casing of a transmission which stores a plurality of shafts and gears, lubricating oil collected at the bottom of the casing can be pumped up by a differential gear (a final gear for a final speed reducer) and supplied to whatever to be lubricated such as other gears and bearings positioned upward in the casing.

Further, the above-mentioned transmission is provided with a breather structure for regulating temperature and pressure in the casing. This breather structure is configured to ventilate in the casing by providing a through-hole to the casing and a pipe (a breather-pipe) communicating to the outside. In this case, in the above-described breather structure, high-temperature and high-pressure oil might spout out outside the casing from the through-hole and the pipe, depending on conditions such as positions at and directions in which the through-hole and the pipe is arranged.

And, if in the casing of the transmission, the breather structure is arranged higher than the differential gear, the hydraulic fluid pumped up by the differential gear might be dispersed to the breather structure and a perimeter thereof. Therefore, as a counter measure to prevent that the hydraulic fluid would spout out from the through-hole and the pipe of the breather structure, a platy guide member (a baffle plate) can be considered to be installed in the casing for receiving and rectifying the hydraulic fluid pumped up by the differential gear.

However, if the guide member is newly installed, an installation space for such new component needs to be secured, which will necessitate to change a layout of components in the casing. In addition, it will necessitate to newly secure mounting positions (bolt holes and a boss section for installing them, etc.) for mounting to the casing fasteners such as bolts for fixing the guide member, which might necessitate to change a shape of the casing. Furthermore, an increase in number of parts might increase the transmission in weight and dimensions of the transmission and lead to complexity of manufacture process.

SUMMARY OF THE INVENTION

In view of the above-described problems, the invention has an object to provide a lubrication structure for a transmission which can install a guide member to rectify lubricating oil with a simple structure without increase in number of parts, and can lead the lubricating oil pumped up by a final gear to an appropriate place in the casing.

In order to solve the above-mentioned problems, this invention is a lubrication structure for lubricating an inside of a casing (3) of a transmission (1) which stores a plurality of shafts and gears (7) by hydraulic fluid pumped up by a rotation of a final gear (8) for a final speed reducer. The lubrication structure includes a hollow piping member (10) attached to the inside of the casing (3) in which the hydraulic fluid circulates, a guide member (40) integrally provided on a peripheral surface (10c) of the piping member (10), and a breather mechanism (4) arranged higher than the final gear (8) in the casing (3) in a state of the transmission (1) being disposed. The guide member (40) structured to have a plurality of surfaces including a first surface (41) which is arranged along part of a peripheral surface (8a) of the final gear (8) and receives at least part of hydraulic fluid pumped up by the final gear (8) and a second surface (42) which is connected to an end side (41a) of the first surface (41), extending in a direction along a side (8b) of the final gear (8) and attached to the casing (3) with a fastening force of a fastener (45). The breather mechanism (4) is positioned higher than the guide member (40) in the casing (3).

The lubrication structure of the transmission according to this invention has a superior effect in a following way. Located higher than the guide member in the in casing, the breather mechanism can restrain the hydraulic fluid pumped up by the final gear to be dispersed to the breather mechanism and a neighborhood thereof, thereby, due to the breather mechanism, avoiding the hydraulic fluid in the casing to blow outside the casing.

Component parts of the transmission can be kept in a small number because of the guide member for receiving the hydraulic fluid pumped up by the final gear integrally onto the peripheral surface of the piping member. Also, installation of the guide member and the piping member to the casing only in a single process can simplify a manufacture process of the transmission and reduce the number of parts necessary for the installation thereof.

The guide member includes the first surface arranged along part of the peripheral surface of the final gear and the second surface connected to the end side of the first surface and extending along the side of the final gear, which realizes a condition that the peripheral surface and the side of the final gear are surrounded by the guide member. This allows to in the guide member, effectively receive and rectify the hydraulic fluid pumped up by the final gear.

Because the piping member and a mounting position thereof vibrate (resonate) up and down in the casing due to vibration, an abrasion might occur at a connection point of the piping member and a fastening point of the fastener to the casing. In contrast, according to this invention, the hydraulic fluid pumped up by the final gear is received on the first surface of the guide member, whereby the second surface and the fastening point of the fastener are given constant load, allowing to restrain vibration of the piping member and the guide member. In this way, it can effectively prevent an abrasion from occurring at the fastening point of the piping member and the connection point of the fastener to the casing.

In addition, in the above-mentioned lubrication structure, the transmission (1) includes: a first input shaft (6a) connected engageably and disengageably, via a first clutch (CL1), to a drive shaft (50a) communicating to a driving source (50) of a vehicle; a second input shaft (6b) connected engageably and disengageably, via a second clutch (CL2), to the drive shaft (50a); a plurality of drive gears (7a), arranged on the first input shaft (6a), for changing rotation speed due to driving force input to the first input shaft (6a); a plurality of other drive gears (7b), arranged on the second the input shaft (6b), for changing rotation speed due to driving force input to the second input shaft (6b); and an output shaft (6c), to which a plurality of driven gears (7c) meshing with a plurality of drive gears (7a, 7b) are fixed, for outputting speed-changed driving force via the drive gears (7a, 7b) and the driven gears (7c). The output shaft (6c) should be positioned lower than the second input shaft (6b) and, a surface direction of the first surface (41) of the guide member (40) should extend toward the output shaft (6c) or the driven gears (7c).

According to this constitution, as the surface direction of the first surface of the guide member extends toward the output shaft or the driven gears on the output shaft, the hydraulic fluid received by the guide member becomes to be led to the output shaft or the driven gears. Thus, it allows to directly lubricate the output shaft and the driven gears on the output shaft, and indirectly lubricate the first and second input shafts and the drive gears on the first and second input shafts.

Further, the above-mentioned lubrication structure includes: a first synchronous engaging device (21) for selectively synchronously-engaging one of the drive gears (7a) on the first input shaft (6a) with the first input shaft (6a); a first shifting actuator (31) for driving the first synchronous engaging device (21), a second synchronous engaging device (21) for selectively synchronously-engaging one of the drive gears (7b) on the second input shaft (6b) with the second input shaft (6b); and a second shifting actuator (32) for driving the second synchronous engaging device (22). At least one of the first shifting actuator (31) and the second shifting actuator (32) should be positioned higher than the guide member (40).

This configuration can prevent the hydraulic fluid pumped up by the final gear from being dispersed to the shifting actuator, allowing to protect the shifting actuator.

Further, in the above-mentioned lubrication structure, the guide member (40) includes a third surface (43) connected to another end side (41b) of the first surface (41), whereby the second surface (42) and the third surface (43) should extend respectively outward and inward in a diameter direction of the final gear (8) from the first surface (41).

According to this configuration, the second and third surfaces of the guide member extend in an alternate direction from the first surface, allowing to improve flexibility of mounting positions and angles and mounting workability when mounting the guide member to the casing. In addition, in the above-described lubrication structure, width dimensions of the first surface (41) in the axial direction of the transmission (1) should be set larger than width dimensions of the final gear (8).

This configuration can more effectively receive the hydraulic fluid pumped up by the final gear on the first surface of the guide member by setting a width dimension of the first surface of the guide member larger than a width dimension of the final gear, allowing to restrain the hydraulic fluid pumped up by the final gear to be dispersed more.

Alternatively, in the above-described lubrication structure, the piping member (10) may be a pipe for supplying lubricating oil sent from a hydraulic pressure supply resource to a shaft center of the shaft (6).

In the lubrication structure of this invention, receiving the hydraulic fluid pumped up by the final gear on the first surface of the guide member might cause vibration to the guide member and the piping member. At this time, pulsation might occur in a flow of the hydraulic fluid in the piping member when the hydraulic fluid passes in the piping member. In contrast, according to the above-described configuration, because the hydraulic fluid circulating in the piping member is for lubrication, but not for speed control, an effect of pulsation which may possibly occur in the hydraulic fluid flowing in the piping member can be minimized. Note that the above characters in parentheses represent, by way of example, reference characters of components of embodiments to be described herein later.

According to the lubrication structure of the transmission of this invention, the guide member for receiving and rectifying lubricating oil pumped up by the final gear can be installed in a simple configuration without an increase in number of component parts, thereby allowing to lead the lubricating oil pumped up by the final gear to an appropriate place in the casing.

DETAILED DESCRIPTION

Figure 1:
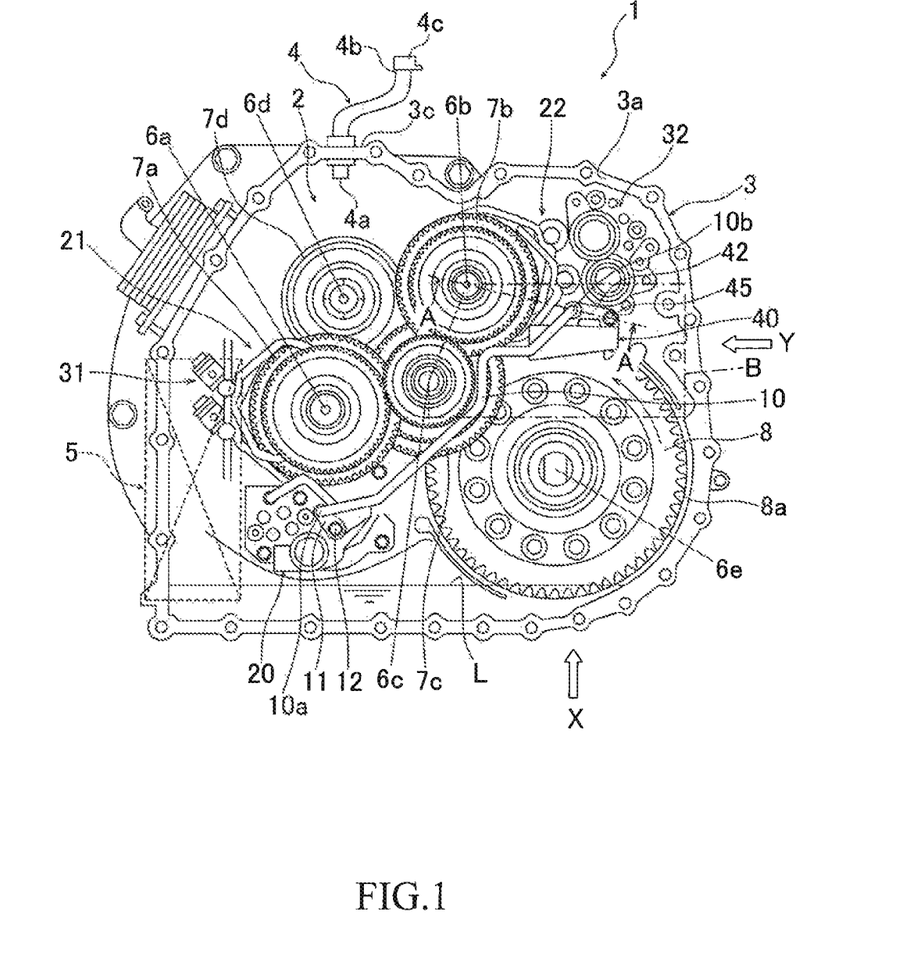
FIG. 1 is a schematic side sectional view illustrating a transmission provided with a lubrication structure in accordance with a first embodiment of this invention.

Hereinafter, an embodiment of the present invention will be described in detail with reference to the appending drawings. FIG. 1 is a schematic side sectional view illustrating a general configuration of a transmission (an automatic transmission) having lubrication structure of one embodiment of this invention. The transmission 1 shown in the figure includes a gear mechanism 2 installed in a casing 3 and a hydraulic control body (a hydraulic control device) 5 equipped with on the lateral of the gear mechanism. The gear mechanism 2 includes a first input shaft 6a and a second input shaft 6b, which are arranged parallel to each other, an output shaft 6c, an idling shaft 6d and a differential shaft 6e. And various gears for forming gear positions are rotatably-installed around these shafts 6. In the casing 3, the output shaft 6c is positioned lower than the second input shaft 6b.

Figure 3:
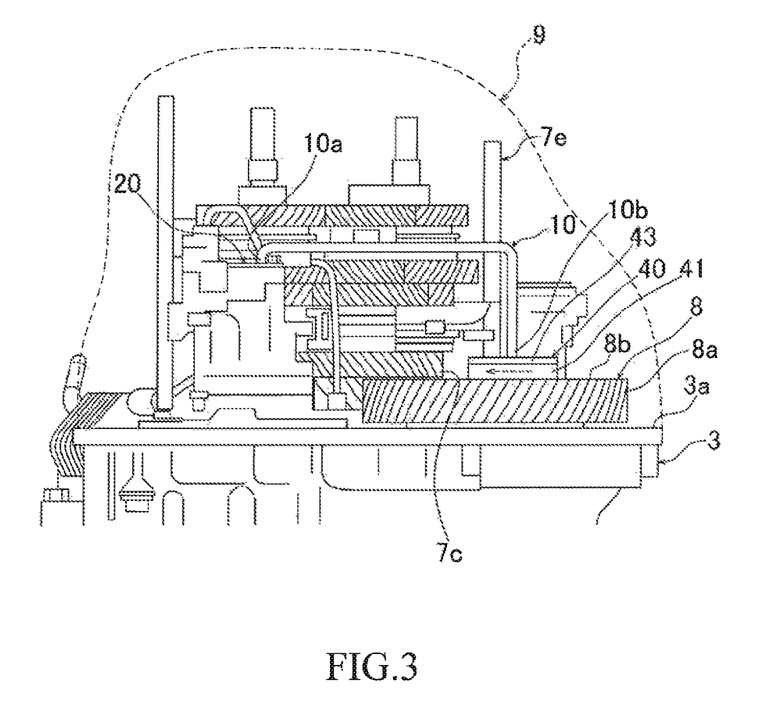
FIG. 3 is an X-arrow view of FIG. 1.
Figure 4:
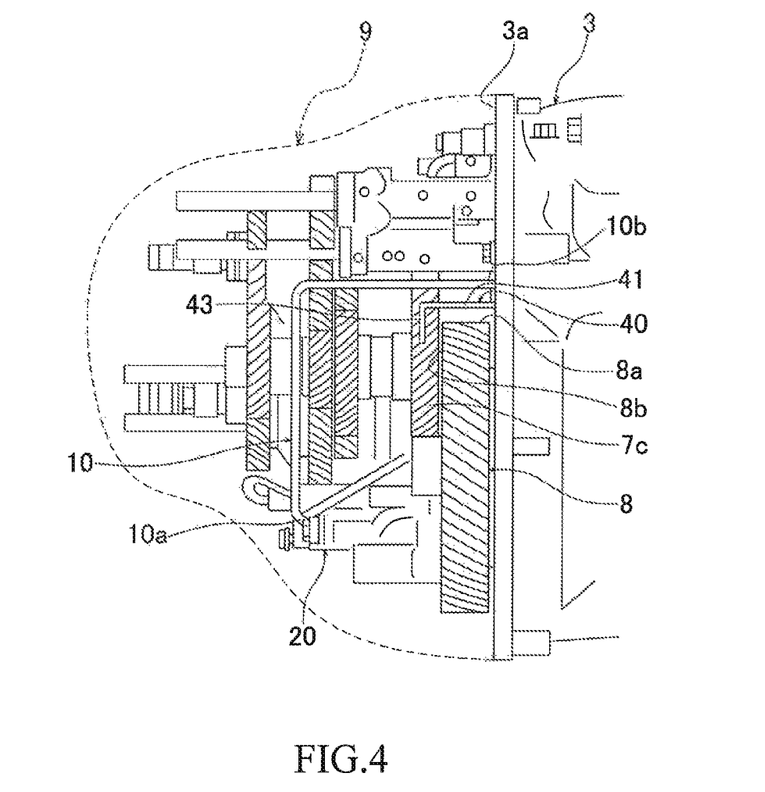
FIG. 4 is an Y-arrow view of FIG. 1.

Note that FIG. 1 illustrates the transmission 1 of which a transmission casing 9 (ref. FIGS. 3 and 4), another casing surrounding the gear mechanism 2 attached to a matching surface 3a of the casing 3, is removed, being viewed from a near side of the axial direction of the shafts 6. FIG. 1 omits a detailed illustration of components except the gear mechanism 2 included in the transmission 1 and synchronous engaging devices (a synchromesh mechanisms) 21, 22 to be mentioned later.

On the first input shaft 6a, a plurality of drive gears 7a for changing rotation speed caused by a driving force input to the first input shaft 6a are installed, and on the second input shaft 6b, a plurality of drive gear 7b for changing rotation speed caused by a driving force input to the second input shaft 6b are installed. The drive gears 7a on the first input shaft 6a are for even-number gear positions, and the drive gears 7b on the second input shaft 6b are for odd-number gear positions.

On the output shaft 6c, a plurality of driven gears 7c meshing with the plurality of drive gears 7a, 7b on the first and second input shafts 6a, 6b are fixed. This output shaft 6c outputs a driving force speed-changed via the drive gears 7a, 7b and the driven gears 7c. Furthermore, the transmission 1 includes a first synchronous engaging device 21 for selectively synchronizing any of the drive gears 7 to the first input shaft 6a and a second synchronous engaging device 22 for selectively synchronizing any of the drive gears 7b to the second input shaft 6b. The transmission 1 is also provided with a first shift actuator (a shifting actuator) 31 for driving the first synchronous engaging device 21 and a second shift actuator (a shifting actuator) 32 for driving the second synchronous engaging device 22.

Figure 2:
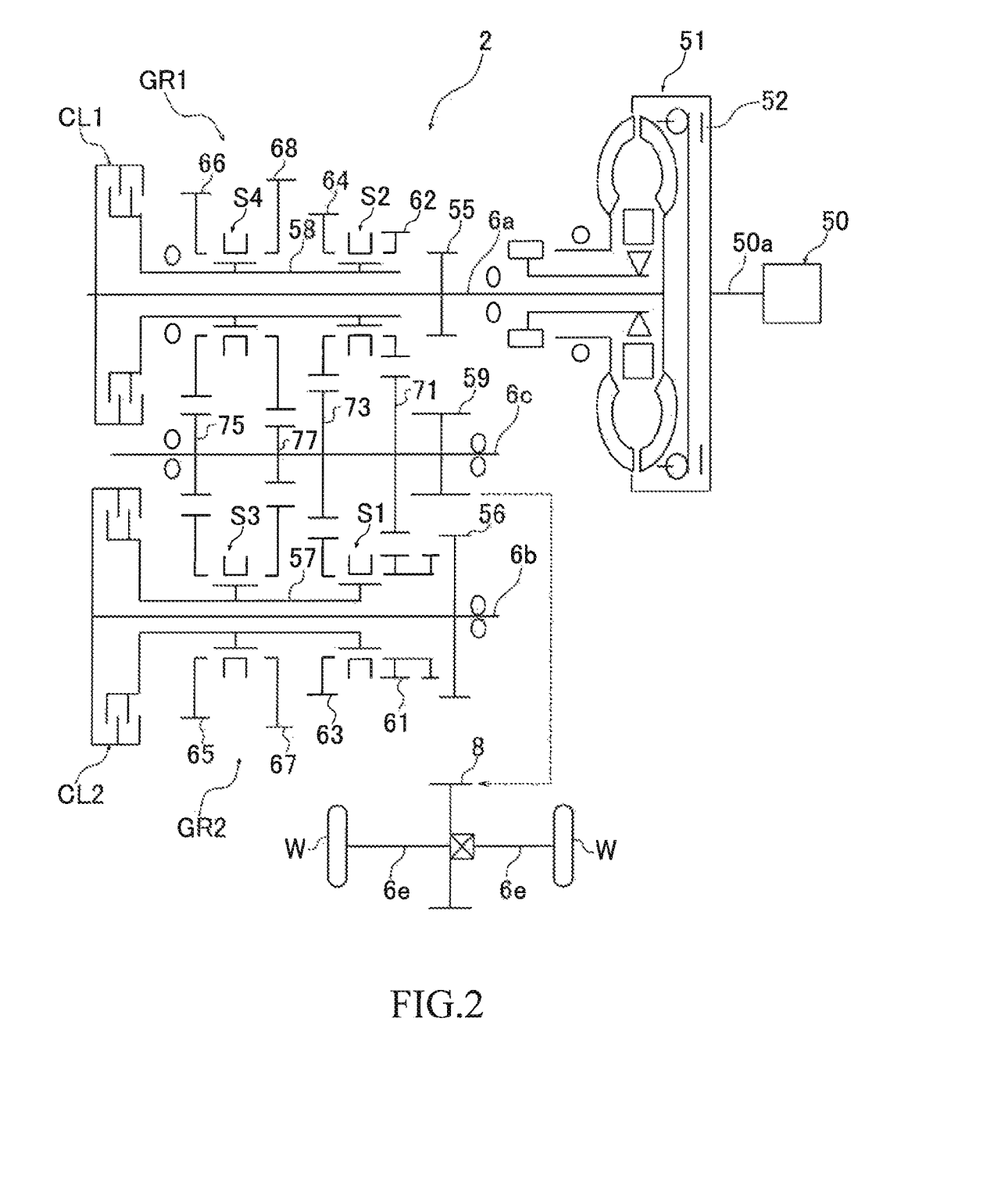
FIG. 2 is a skeleton view of the transmission.

FIG. 2 is a skeleton view of the transmission 1. As is shown in the figure, rotation outputs of an engine 50 which is a driving source of a vehicle are output to a crankshaft (an output shaft of the engine 50) 50a. A rotation of the crankshaft 50a is transmitted to a torque converter 51 with a lock-up clutch 52 and transmitted therefrom to the first and second input shafts 6a, 6b via a first clutch CL1 and a second clutch CL2. In other words, the first and second input shafts 6a, 6b are connected engageably and disengageably to the output shaft 50a of the engine 50 via the first and second clutches CL1, CL2 respectively. In addition, rotation torques of the first and second input shafts 6a, 6b are transmitted to the output shaft 6c via the gear mechanism 2. Also, rotation torques of the output shaft 6c are transmitted to driving wheels W, W of the vehicle via a gear 59 and a differential gear 8.

The gear mechanism 2 shown in FIG. 2 is a twin clutch-type automatic transmission mechanism allowing to set eight foreword gear positions and one reverse gear position. In this gear mechanism 2, the drive gear 55 fixedly-installed on the first input shaft 6a meshes with the driven gear 56 fixedly-installed on the second input shaft 6b. Note that the gear mechanism 2 is provided with mechanisms such as the idling shaft 6d (ref. FIG. 1), a reverse shaft and a reverse gear for setting a reverse gear position, which are not shown in FIG. 2.

At an axial end of the first input shaft 6a, the first clutch (the clutch for even-number gear positions) CL1 is arranged. The first clutch CL1 switches engagement and disengagement between the first input shaft 6a and the second drive shaft 58 fit relatively-rotatably to an outer periphery thereof. To the second drive shaft 58, a second speed driving gear 62, a fourth speed driving gear 64, a sixth speed driving gear 66 and an eighth speed driving gear 68 are supported relatively-rotatably. And the second and fourth speed driving gears 62, 64 are selectively connectable to the second driving shaft by a second-to-fourth speed synchronous engaging device (an engagement switching device) S2, and the sixth and eighth speed driving gears 66 and 68 are selectively connectable to the drive shaft 58 by a six-to-eight synchronous engaging device (an engagement switching device) S4. Note that the second, fourth, sixth and eighth speed driving gears 62, 64, 66, 68 shown in FIG. 2 are the drive gears 7a on the first input shaft 6a shown in FIG. 1, and the second-to-fourth speed synchronous engaging device S2 and the sixth-to-eighth synchronous engaging device S4 shown in FIG. 2 are the first synchronous engaging device 22 shown in FIG. 1.

In addition, at an axial end of the second input shaft 6b, a second clutch (a clutch for odd-number gear positions) CL2 is positioned. The second clutch CL2 switches engagement and disengagement between the second input shaft 6b and the second drive shaft 57 fit relatively-rotatably to an outer periphery thereof. To the second drive shaft 57, a first speed driving gear 61, a third speed driving gear 63, a fifth speed driving gear 65 and a seventh speed driving gear 67 are supported relatively-rotatably. And the first and third speed driving gears 61, 63 are selectively connectable to the first driving shaft 57 by a first-to-third speed synchronous engaging device (an engagement switching device) S1, and the fifth and seventh speed driving gears 65 and 67 are selectively connectable to the drive shaft 57 by a fifth-to-seventh synchronous engaging device (an engagement switching device) S3. Note that the first, third, fifth and seventh speed driving gears 61, 63, 65, 67 shown in FIG. 2 are the drive gears 7b on the second input shaft 6b shown in FIG. 1, and the first-to-third speed synchronous engaging device S1 and the fifth-to-seventh synchronous engaging device S3 shown in FIG. 2 are the second synchronous engaging device 22 shown in FIG. 1.

In addition, on the output shaft 6c, first and second speed driven gears 71, third and fourth speed driven gears 73, fifth and sixth speed driven gears 75 and seventh and eighth speed driven gears 77 are fixedly-installed. With the first and second speed driven gears 71, the first speed drive gear 61 on the first drive shaft 57 and the second speed drive gear 62 on the second drive shaft 58 mesh. With the third and fourth speed driven gears 73, the third gear drive gear 63 on the first drive shaft 57 and the fourth speed drive gear 64 on the second drive shaft 58 mesh. With the fifth and sixth speed driven gears 75, the fifth speed drive gear 65 on the first drive shaft 57 and the sixth speed drive gear 66 on the second drive shaft 58 mesh. With the seventh and eighth speed driven gears 77, the seventh speed drive gear 67 on the first drive shaft 57 and the eighth speed drive gear 68 on the second drive shaft 58 mesh. Note that the first and second speed driven gears 71 and the third and fourth speed driven gears 73 and the fifth and sixth speed driven gears 75 and the seventh and eighth speed driven gears 77 shown in FIG. 2 are the driven gears 7c on the output shaft 6c shown in FIG. 1.

The above-described first clutch CL1, the second, fourth, sixth and eighth speed drive gears 62, 64, 66, 68, the second-to-fourth speed synchronous engaging device S2 and the sixth-to-eighth speed synchronous engaging device S4 constitute a first transmission mechanism GR1 for setting the even-number gear positions. Similarly, the above-described second clutch CL2, the first, third, fifth and seventh speed drive gears 61, 63, 65, 67, the first-to-third speed synchronous engaging device S1 and the fifth-to-seventh speed synchronous engaging device S3 constitute a second transmission mechanism GR2 for setting the odd-number gear positions On one hand, when engaging the first clutch CL1 in this transmission 2, a driving force of the crankshaft 50a of the engine 50 is transmitted to the second transmission mechanism GR2 in a path: the torque converter 51, the drive gear 15 on the first input shaft 6a, the driven gear 56 on the second input shaft 6b, the second input shaft 6b, the second clutch CL2. On the other hand, when engaging the second clutch CL2, a driving force of the crankshaft 50a of the engine 50 is transmitted to the first transmission mechanism GR1 in a path: the torque converter 51, the first input shaft 6a, the first input shaft 6a, the first clutch CL1.

Therefore, the first speed gear position is established when engaging the first clutch CL2 in a state that the first speed drive gear 61 is connected to the first drive shaft 57 after shifting the first-to-third speed synchronous engaging device S1 rightward. The second speed gear position is established when engaging the second clutch CL2 in a state that the second speed drive gear 62 is connected to the second drive shaft 58 with the second-to-fourth speed synchronous engaging device S2 shifted rightward. The third speed gear position is established when engaging the second clutch CL2 in a state that the third speed drive gear 63 is connected to the first drive shaft 57 with the first-to-third speed synchronous engaging device S1 shifted rightward. And, the fourth speed gear position is established when engaging the first clutch CL1 in a state that the fourth speed drive gear 64 is connected to the second drive shaft 57 with the second-to-fourth speed synchronous engaging device S2 shifted rightward. In this manner, each of the first to eighth speed gear positions can be set by switching engagement between each of the synchronous engaging devices S1-S4 and the first and second clutches CL1, CL2.

Back to FIG. 1, on a sidewall 3c of an upper end in the casing 3, or in detail, on a sidewall 3c positioned directly above the idling shaft 6d, a breather-pipe (a breather mechanism) 4 for ventilating in the casing 3 is attached. The breather-pipe 4 is arranged to be penetrated the sidewall vertically, namely, in the axial direction of the breather-pipe. An intake end 4a which is one open end is positioned inside the casing 3, and an exhaust end 4b which is the other open end is positioned outside the casing 3. The intake end 4a of the breather-pipe 4 is open downward at a position directly above the idling shaft 6d in the casing 3. On the other hand, the exhaust end 4b of the breather-pipe 4 is covered with a cap 4c made of synthetic resin. An exhaust opening provided to the cap 4c is open laterally to the axial direction of the breather-pipe 4.

The hydraulic control body 5 which is a device provided with a valve for changing gears to be operated by hydraulic pressure is arranged on an end side of the bottom of the transmission 1 (left bottom side in FIG. 1). The hydraulic control body 5 communicates with an adjacent hydraulic fluid port section 20 via a not-shown oil passage. Furthermore, each port of the hydraulic fluid port section 20 communicates with the second shift actuator 32 via a plurality of hydraulic pressure pipes (not shown in the figure) in which hydraulic fluid circulate. Due to this, hydraulic fluid (control hydraulic pressure) which has been supplied from the oil pump (not shown in the figure) and has flowed out from the hydraulic control body 5 is adapted to be sent the second shift actuator 32 via the hydraulic pressure pipe.

Figure 5:
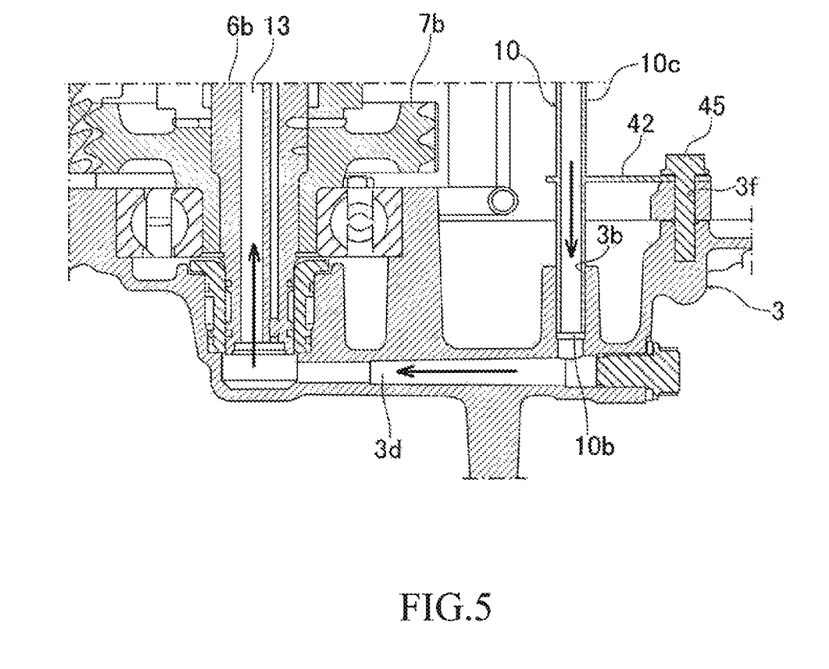
FIG. 5 is an A-A cross sectional arrow view of FIG. 1 for illustrating lubricating oil flowing in a lubricating oil pipe.

FIG. 3 is an X-arrow view of FIG. 1, and FIG. 4 is a Y-arrow view of FIG. 1. As shown in FIGS. 1, 3, 4, a lubricating oil pipe 10 is installed in the casing 3 for leading hydraulic fluid (lubricating oil), which has been discharged from the oil pump and sent into the casing via the hydraulic control body 5, to an oil passage (ref. FIG. 5) in the second input shaft 6b. One end 10a of the lubricating oil pipe 10 is connected to the hydraulic fluid port section 20 provided below the first input shaft 6a in the casing 3, and another end 10b thereof is inserted in a plug hole 3b (ref to FIG. 5) provided above the differential gear 8. In a neighborhood of the end 10a of the lubricating oil pipe 10, a mounting plate 11 for mounting the end 10a to the hydraulic fluid port section 20 is integrally-disposed. The end 10a of the lubricating oil pipe 10 is mounted by fastening this mounting plate 11 to the hydraulic fluid port section 20 by means of a bolt 12.

As shown in FIGS. 3 and 4, a neighborhood portion of the end 10a of the lubricating oil pipe 10 on the hydraulic fluid port section 20 side extends along the axial direction of the transmission 1. Beyond that, the lubricating oil pipe 10 is bent perpendicular to the axial direction of the transmission 1, and beyond that, extends toward a position directly above the differential gear 8 along the same direction. Then, the lubricating oil pipe 10 is again bent to the axial direction of transmission 1 before the other end 10b, and beyond that, the end 10b extending in the same direction is attached to the casing 3.

FIG. 5 is an A-A cross-sectional arrow view of FIG. 1, illustrating lubricating oil flowing in the lubricating oil pipe 10. As shown in the figure, the other end 10b of the lubricating oil pipe 10 is inserted in a plug hole 3b provided to the casing 3. A passage of this lubricating oil pipe 10 communicates, via an oil passage 3d formed in the casing 3, with an oil passage 13 provided at a center of the second input shaft 6b. Thus, hydraulic fluid (lubricating oil) for lubrication sent from the hydraulic control body 5 is adapted to be sent, via the lubricating oil pipe 10, to the inside of the second input shaft 6b. In other words, the lubricating oil pipe 10 is a lubricating oil supply pipe for supplying lubricating oil from an oil pump to an inside (a shaft center) of the shaft 6 of the transmission 1. Note that both axial directions of the end 10b of the lubricating oil pipe 10 and the plug hole 3b are parallel to the axial direction of the transmission 1, and an axial direction of the oil passage 3d in the casing 3 is substantially perpendicular to the axial direction of the transmission 1.

Figure 6:
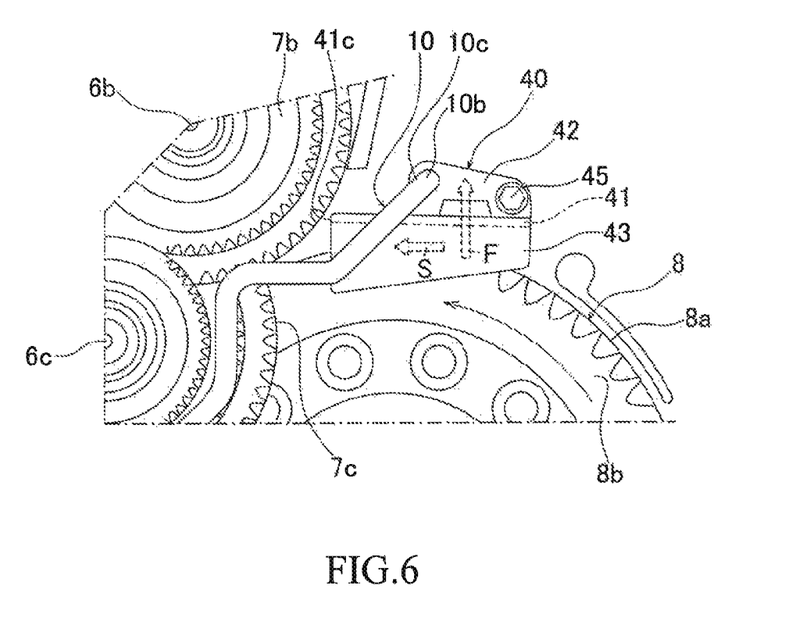
FIG. 6 is a partially-enlarged view of B of FIG. 1 illustrating a detailed configuration of the guide member installed integrally with the lubricating oil pipe.
Figure 7:
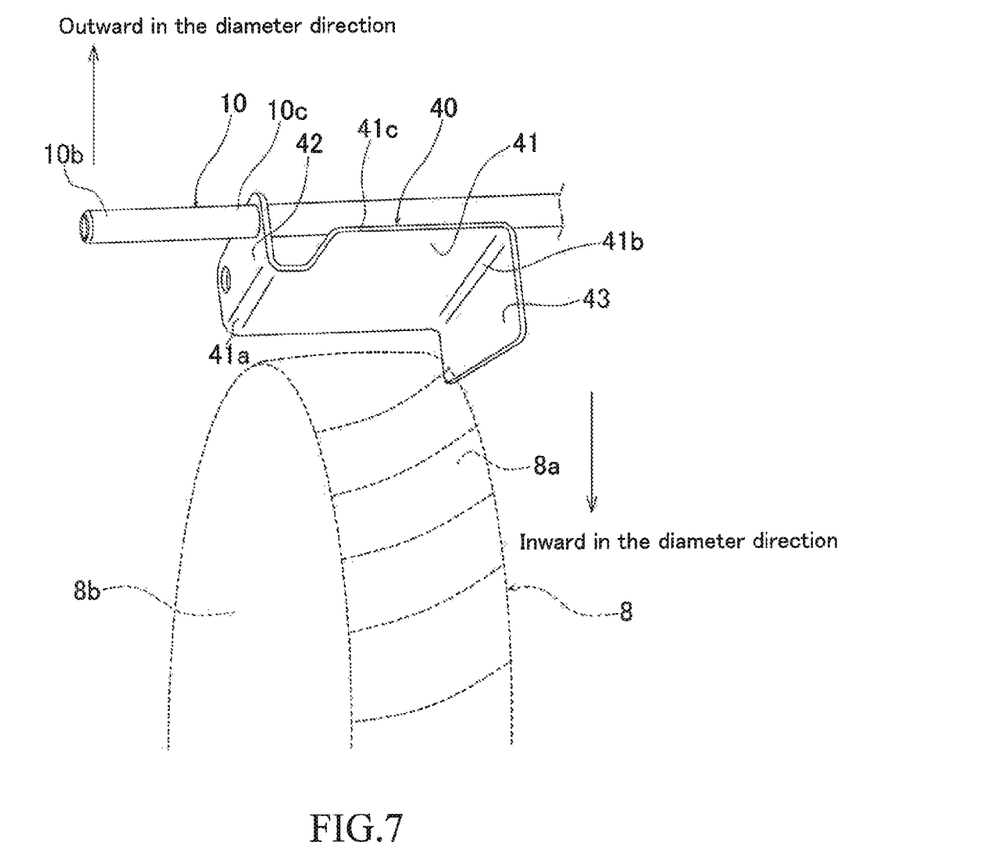
FIG. 7 is a perspective view showing the guide member.

And as shown in FIG. 1, on the outer peripheral surface 10c of a neighborhood of the end 10b of the lubricating oil pipe 10, a guide member 40 for receiving and rectifying hydraulic fluid pumped up by a rotation of the differential gear 8 is integrally installed. FIG. 6 and FIG. 7 are views illustrating detailed configurations of the guide member 40. FIG. 6 is an enlarged view of B of FIG. 1, and FIG. 7 is a perspective view of the guide member 40. Note that FIG. 7 is a perspective view of the guide member 40 viewed laterally from the axial direction of the transmission 1 (from the left side of FIG. 1). In this figure, an illustration of the casing 3 to which the end 10b of the lubricating oil pipe 10 attached is omitted. As shown in these figures, the guide member 40 is a member formed of an appropriately-bent metal plate, and integrally attached by welding to the outer peripheral surface 10c of the lubricating oil pipe 10. This guide member 40 is configured, including a substantially flat plate-shaped top plate section (a first surface) 41 positioned along a part (an upper part) of the outer peripheral surface 8a of the differential gear 8, a substantially flat plate-shaped mount (a second surface) 42 connected with one end side (one end side in the axial direction of the transmission 1) 41a of the top plate section 41 and extending downward along the side 8b of the differential gear 8, and a projected piece-shaped side plate section (a third surface) 43 connected with another end (another end side in the axial direction of the transmission 1) 41b of the top plate section 41 and extending downward along the side 8b of the differential gear 8.

An undersurface of the top plate section 41 of the guide member 40 is opposed to the peripheral surface 8a of the differential gear 8 and receive most hydraulic fluid pumped up by a rotation of the differential gear 8. The mount 42 is a surface for mounting the guide member 40 and the lubricating oil pipe 10 to the casing 3. This mount 42 is fastened to a position of the casing 3 nearly directly above the differential gear 8 by a bolt (a fastener) 45. The side plate section 43 is a projected piece-shaped part formed so as to cover the outer peripheral surface 8a of the differential gear 8 and the neighborhood side 8b thereof. This side plate section 43 receives hydraulic fluid pumped up by a rotation of the differential gear 8 and further dispersed to the lateral direction (the axial direction) of the differential gear 8.

As shown in FIGS. 6 and 7, on one hand, the mount 42 of the guide member 40 extends from the top plate section 41 outward (upward) in the diameter direction of the differential gear 8. On the other hand, the side plate section 43 extends from the top plate section 41 inward (downward) in the diameter direction of the differential gear 8.

Further, as shown in FIGS. 4 and 7, a width dimension of the top plate section 41 of the guide member 40 in the axial direction of the transmission 1 is set larger than a width dimension (thickness dimension) of the differential gear 8. Also, as shown in FIG. 1, FIG. 6, etc., a surface direction of the top plate section 41 of the guide member 40 is toward the output shaft 6c or the driven gear 7c on the output shaft 6c. In other words, the output shaft 6c and the driven gear 7c are positioned extending along the surface direction of the top plate section 41 of the guide member 40 (positions as an extension of the top plate section 41). In addition, as shown in FIG. 1, the breather-pipe 4 and the first shift actuator 32 are positioned higher than the guide member 40 in casing 3.

In the following, a flow of hydraulic fluid pumped up by the differential gear 8 will be described. As shown in FIG. 1, the bottom of the casing 3 is an oil reservoir L where lubricating oil can be retained at a predetermined static liquid level. Normally, a lower end of the outer peripheral surface (tooth surface) 8*a* of the differential gear 8 is immersed in the oil reservoir. Therefore, by a rotation (a counter-clockwise rotation in FIG. 1) of the differential gear 8, the lubricating oil in the oil reservoir L is adapted to be pumped up to a tangential direction of the outer peripheral surface 8*a* (to an upper part in the casing).

The guide member 40 of this embodiment includes the top plate section 41 arranged along the upper peripheral surface 8*a* of the differential gear 8 and the side plate section 43 extending downward along the side 8*b* of the differential gear 8 from the end 41*b* of the top plate section 41. Thus, as shown in FIG. 6, hydraulic fluid pumped up by a rotation of the differential gear 8 is received by the top plate section 41 or the side plate section 43 of the guide member 40. And, the breather-pipe 4 is positioned higher than the guide member 40 in the casing 3, thereby allowing to restrain hydraulic fluid pumped up by the differential gear 8 to be dispersed to the breather-pipe 4 and neighborhoods thereof, and further to avoid hydraulic fluid in the casing 3 to blow outside the casing 3 from the breather-pipe 4.

Namely, here, the breather-pipe 4 is positioned higher than (obliquely above) the guide member 40 in the casing 3, and the guide member 40 is positioned on the tangent extending toward the breather-pipe 4 along the rotational direction of the differential gear 8. Therefore, without the guide member 40, hydraulic fluid pumped up by the differential gear 8 will be dispersed to the intake end 4*a* of the breather-pipe 4 or neighborhoods thereof, which might cause the hydraulic fluid to blow out from the breather-pipe 4. On the contrary, the transmission 1 of this embodiment provided with the abovementioned guide member 40 can receive hydraulic fluid pumped up by the differential gear 8 by the guide member 40, allowing to effectively prevent the hydraulic fluid from being dispersed to the intake end 4*a* of the breather-pipe 4 or neighborhoods thereof.

In addition, the second shift actuator 32 is positioned higher than the guide member 40, allowing to prevent hydraulic fluid pumped up by the final gear from being dispersed to the shifting actuator and thus to protect the second shift actuator 32.

On the other hand, the hydraulic fluid received by the top plate section 41 of the guide member 40 flows, as shown by arrow S in FIG. 6, along the surface of the top plate section 41 in the rotation direction of the differential gear 8 (in direction toward the left side in FIG. 6) and flows out from the end (the left end in FIG. 6) 41*c* of the top plate section 41. This hydraulic fluid jumps out along the extending direction of the surface of the top plate section 41 and is then, beyond that, dispersed to the output shaft 6*c* or the driven gears 7*c*. Thus, the surface direction of the top plate section 41 of the guide member 40 extends to the output shaft 6*c* or the driven gears 7*c*, allowing the hydraulic fluid received by the guide member 40 to be led to the output shaft 6*c* or the driven gears 7*c*. Thus, the output shaft 6*c* and the driven gears 7*c* on the output shaft 6*c* can be directly lubricated, and the first and second input shafts 6*a*, 6*b* and the drive gears 7*a*, 7*b* on the first and second input shafts 6*a*, 6*b* can be indirectly lubricated.

Further, in the transmission 1 of this embodiment, since the lubricating oil pipe 10 and the installation position thereof vertically vibrate (resonate) to the casing 3 due to vibration while driving, abrasion might occur to the connection point (the plug hole 3*b*) of the lubricating oil pipe 10 and a fastening point (a bolt fastening hole 3*f*) of the bolt 45 to the casing 3. In contrast, according to the configuration provided with the guide member 40 of this embodiment, hydraulic fluid pumped up by the differential gear 8 is received by the top plate section 41 of the guide member 40, whereby a constant load (an upward load in the figure) is applied to the mount 42 and the fastening point of the bolt 45 as shown by arrow F of FIG. 6. As this load is applied to a perpendicular direction to the axial direction of the bolt 45, it can act as a load holding the shaft center of the bolt 45 in relation to the center of the bolt fastening hole 3*f* at a constant position. Similarly, as this load is applied to a perpendicular direction to the axial direction of the end 10*b* of the lubricating oil pipe 10, it can act as a load holding the shaft center of the lubricating oil pipe 10 in relation to the center of pipe plug hole 3*b* at a constant position. These can effectively restrain the lubricating oil pipe 10 and the guide member 40 to vibrate, thereby allowing to effectively prevent abrasion to the connection point of the lubricating oil pipe 10 and the fastening point of the bolt 45 to the casing 3.

In this embodiment, the number of parts of the transmission 1 can be reduced by providing the guide member 40 integrally on the peripheral surface 10*c* of the lubricating oil pipe 10 for receiving hydraulic fluid pumped up by the differential gear 8. In addition, the guide member 40 and the lubricating oil pipe 10 can be installed to the casing 3 only by one process, which can achieve simplification of the manufacture process of the transmission 1 and reduction of the number of parts necessary for mounting the guide member 40 and the lubricating oil pipe 10.

Further, the guide member 40 includes the top plate section 41 arranged along part of the peripheral surface 8*a* of the differential gear 8, and the mount 42 connected to the one end 41*a* of the top plate section 41 and extending along the side 8*b* of the differential gear 8, which leads to a state that the peripheral surface 8*a* and part of the side 8*b* of the differential gear 8 are surrounded by the guide member 40. This enables the guide member 40 to effectively receive hydraulic fluid pumped up by the differential gear 8.

In this embodiment, also, the mount 42 of the guide member 40 extends outward in the diameter direction of the differential gear 8 from the top plate section 41 and, the side plate section 43 extends inward in the diameter direction of the differential gear 8 from the top plate section 41.

According to this configuration, the mount 42 and the side plate section 43 of the guide member extend in an alternate direction from the top plate section, allowing to improve flexibility of mounting positions and angles and mounting workability when mounting the guide member 40 to the casing 3.

While the embodiments of the invention have been described, it is to be understood that the invention is not limited to the foregoing embodiments. Rather, the invention can be modified to incorporate any number of variations or alterations within the scope of claims and the scope of technical concept described in the specification and the drawings thereof. For example, the specific shape and arrangement of the guide member shown in the above-described embodiment is one example thereof. The guide member in accordance with this invention may have another shape and arrangement than that described in the above-described embodiment as far as it meets requirements described in the claims of the present application.

What is claimed is:

1. A lubrication structure for a transmission for lubricating the inside of a casing of the transmission storing a plurality of shafts and gears by hydraulic fluid pumped up by a rotation of a final gear for a final speed reducer, the lubrication structure comprising:
   a hollow piping member attached in the casing in which the hydraulic fluid circulates;
   a guide member integrally provided on a peripheral surface of the piping member; and
   a breather mechanism arranged above the final gear in the casing in a state of the transmission being disposed,
      wherein the guide member comprises a plurality of surfaces including:
         a first surface which is arranged along part of a peripheral surface of the final gear and receives at least part of the hydraulic fluid pumped up by the final gear; and
         a second surface which is connected to an end side of the first surface, extending in a direction along a side of the final gear and attached to the casing with a fastening force of a fastener, and
      wherein the breather mechanism is positioned above the guide member in the casing.

2. The lubrication structure for the transmission according to claim 1, the transmission comprising:
   a first input shaft connected engageably and disengageably, via a first clutch, to a drive shaft communicating to a driving source of a vehicle;
   a second input shaft connected engageably and disengageably, via a second clutch, to the drive shaft;
   a plurality of drive gears, positioned on the first input shaft, for changing rotation speed due to the driving force input to the first input shaft;
   a plurality of other drive gears, positioned on the second input shaft, for changing rotation speed due to driving force input in the second input shaft; and
   an output shaft, to which a plurality of driven gears meshing with the plurality of drive gears are fixed, for outputting speed-changed driving force via the drive gears and the driven gears,
      wherein the output shaft is positioned lower than the second input shaft, and
      wherein a surface direction of the first surface of the guide member extends toward the output shaft or the driven gears.

3. The lubrication structure for the transmission according to claim 2 comprising:
   a first synchronous engaging device for selectively synchronously-engaging one of the drive gears on the first input shaft with the first input shaft;
   a first shifting actuator for driving the first synchronous engaging device;
   a second synchronous engaging device for selectively synchronously-engaging one of the drive gears on the second input shaft with the second input shaft; and
   a second shifting actuator for driving the second synchronous engaging device,
      wherein at least one of the first shifting actuator and the second shifting actuator is positioned higher than the guide member.

4. The lubrication structure for the transmission according to claim 1,
   wherein the guide member further comprises a third surface connected to another end side of the first surface,
   wherein the second surface extends outward in a diameter direction of the final gear from the first surface, and
   wherein the third surface extends inward in a diameter direction of the final gear from the first surface.

5. The lubrication structure for the transmission according to claim 1,
   wherein a width dimension of the first surface in an axial direction of the transmission is set larger than a width dimension of the final gear.

6. The lubrication structure for the transmission according to claim 1,
   wherein the piping member is a pipe for supplying lubricating oil sent from a hydraulic pressure resource to a shaft center of one of the plurality of shafts.

7. The lubrication structure for the transmission according to claim 2,
   wherein the guide member further comprises a third surface connected to another end side of the first surface,
   wherein the second surface extends outward in a diameter direction of the final gear from the first surface, and
   wherein the third surface extends inward in a diameter direction of the final gear from the first surface.

8. The lubrication structure for the transmission according to claim 2,
   wherein a width dimension of the first surface in an axial direction of the transmission is set larger than a width dimension of the final gear.

9. The lubrication structure for the transmission according to claim 1,
   wherein the piping member is a pipe for supplying lubricating oil sent from a hydraulic pressure resource to a shaft center of one of the plurality of shafts.

10. The lubrication structure for the transmission according to claim 2,
    wherein the piping member is a pipe for supplying lubricating oil sent from a hydraulic pressure resource to a shaft center of one of the plurality of shafts.

11. The lubrication structure for the transmission according to claim 3,
    wherein the guide member further comprises a third surface connected to another end side of the first surface,
    wherein the second surface extends outward in a diameter direction of the final gear from the first surface, and
    wherein the third surface extends inward in a diameter direction of the final gear from the first surface.

12. The lubrication structure for the transmission according to claim 3,
    wherein a width dimension of the first surface in an axial direction of the transmission is set larger than a width dimension of the final gear.

13. The lubrication structure for the transmission according to claim 3,
    wherein the piping member is a pipe for supplying lubricating oil sent from a hydraulic pressure resource to a shaft center of the shaft.

14. The lubrication structure for the transmission according to claim 4,
    wherein a width dimension of the first surface in an axial direction of the transmission is set larger than a width dimension of the final gear.

15. The lubrication structure for the transmission according to claim 4,
    wherein the piping member is a pipe for supplying lubricating oil sent from a hydraulic pressure resource to a shaft center of one of the plurality of shafts.

16. The lubrication structure for the transmission according to claim 5, wherein the piping member is a pipe for supplying lubricating oil sent from a hydraulic pressure resource to a shaft center of one of the plurality of shafts.

* * * * *